May 17, 1927. 1,628,975

O. HAWKINS

MILLING ATTACHMENT

Filed Feb. 19, 1926 2 Sheets-Sheet 1

Inventor
OMAR HAWKINS
By Ralph S. Turff
Attorney

May 17, 1927.

O. HAWKINS

MILLING ATTACHMENT

Filed Feb. 19, 1926

Inventor

OMAR HAWKINS

By Ralph S. Turoff

Attorney

Patented May 17, 1927.

1,628,975

UNITED STATES PATENT OFFICE.

OMAR HAWKINS, OF LEESBURG, INDIANA.

MILLING ATTACHMENT.

Application filed February 19, 1926. Serial No. 89,344.

This invention is a novel milling attachment and is especially designed for use as an attachment for drill presses. The invention provides an improved milling attachment which while particularly designed as aforesaid for use in connection with drill presses, may be used as conveniently with lathes, radial drills, or any other similar type of machine.

In particular the invention provides a novel self-contained device as a separate milling attachment; novel connections between the driven member of the drill press or other machine to which it may be attached and the driving member of the device; novel means for securing the attachment to the machine in connection with which it is to be used; and novel means for retaining the milling cutters or tools in proper position.

It is a particular object of the present invention to provide a novel milling attachment which will be inexpensive to manufacture, which will be light in weight, which may be easily handled and conveniently portable; and which will readily convert any machine of the aforementioned drill or lathe type into a highly satisfactory smoothly operable milling machine.

The accompanying drawings illustrate one practical embodiment of the present invention, which will be described in detail to enable others to understand and use the same, but the invention is not considered restricted to the specific construction shown in the drawings and reference is therefore had to the accompanying claims for summaries of the essential features of the invention and of the novel features of construction and of the novel combinations of parts for all of which protection is desired.

Figure 1:
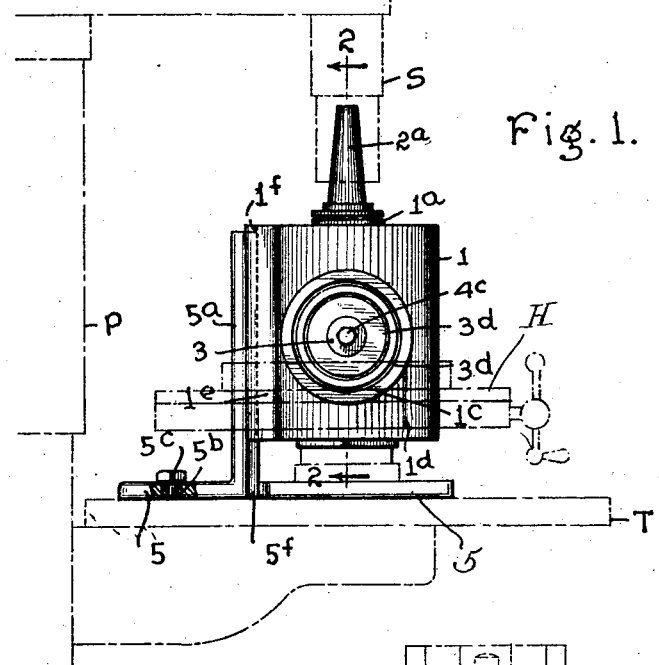
Figure 1 is a side elevation of the complete milling attachment illustrating it as attached to a conventional type of drill press, portions of the press being shown in dotted lines.

As shown in the drawings the operative parts of the device are placed in a suitable housing or casing which may be of any desired exterior form or finish, that shown being preferred. The housing as shown comprises a substantially cylindrical member 1 closed at the top as by the wall $1^a$ which is provided with centrally located bosses constituting a bearing $1^b$ for the drive shaft 2.

The drive shaft 2 is provided with a tapered upper extremity or shank $2^a$ for engagement with the spindle of the machine to which the device is to be attached; in the illustrated embodiment of the invention the spindle S of the drill press P. The shaft 2 is provided with an anti-friction bearing or ball thrust bearing $2^b$ engaging a suitable raceway in the upper surface of the bearing $1^b$. Secured to the inner end of the drive shaft is a beveled pinion $2^c$ meshing with a beveled pinion $3^c$ on a driven shaft 3 as will be hereinafter more fully described.

The housing 1 is provided with diametrically opposite bosses $1^e$ provided with conical recesses $1^d$ for the reception of the anti-friction bearings $3^d$ mounted on the driven shaft 3. The shaft 3 is preferably tubular in form as indicated at $3^a$, having a reduced opening $3^b$ at one end thereof constituting a bearing for the screw rod $4^a$, while the other end thereof is provided with an enlarged tapered portion $3^e$ for the reception of the usual type of spring collet 4. The collet 4 is adapted for the reception of the milling cutter C as is well known in the art.

Figure 3:
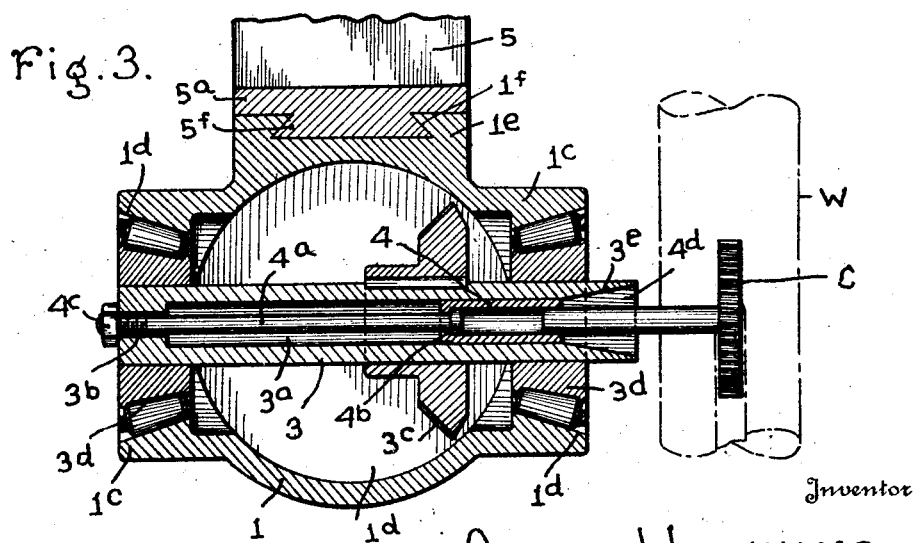
Figure 3 is a horizontal sectional view taken on the line 3—3 of Figure 2.

The inner end of the rod $4^a$ is secured to the collet as indicated at $4^b$, see Figure 3 of the drawings, while the outer end thereof freely passes through the bearing $3^b$ and is screw threaded for engagement with the nut $4^c$. It will be readily understood that after the spindle of a milling cutter has been positioned within the collet, tightening of the nut $4^c$ on the screw rod 4, the said nut bearing against the end of the shaft 3, will draw the collet slightly inwardly and by the action of the tapered wall $3^a$ against the slotted extremity $4^d$ of the collet will hold the milling tool securely in position.

To protect the pinions $2^c$ and $3^c$ and the interior of the housing from dirt and dust a bottom closure plate $1^d$ may be provided for threaded engagement with the interior of the housing.

To provide for vertical adjustment of the entire attachment the rear wall of the housing is provided with a thickened portion $1^e$ with a dove-tailed slot $1^f$ formed therein adapted for sliding engagement with the dove-tail $5^f$ on the upstanding flange $5^a$ of a bracket 5. The bracket is provided with an aperture or apertures $5^b$ and is secured to the table T of the drill press P as by screws of the like $5^c$, see Figure 1. It will be readily understood that in the use of the attachment with a drill press, upon vertical movement or reciprocation of the spindle of the press and associated parts the entire milling attachment will be raised or lowered until proper engagement of the milling cutter C with the work W is had.

Figure 4:
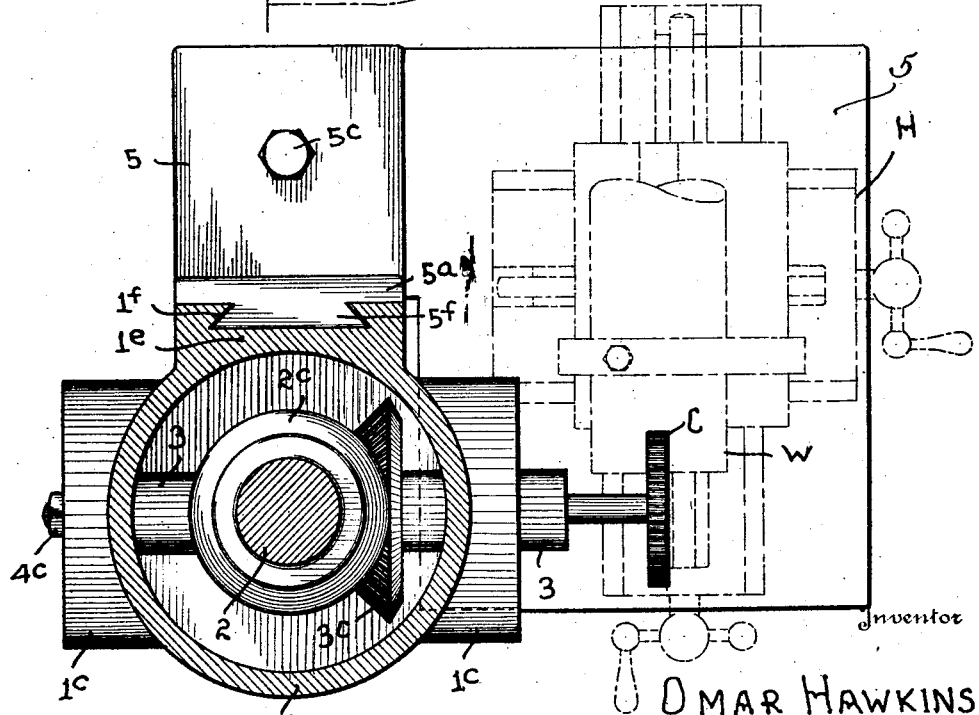
Figure 4 is a horizontal sectional view taken on the line 4—4 of Figure 2, the work and work holding means being indicated in dotted lines.
Figure 2:
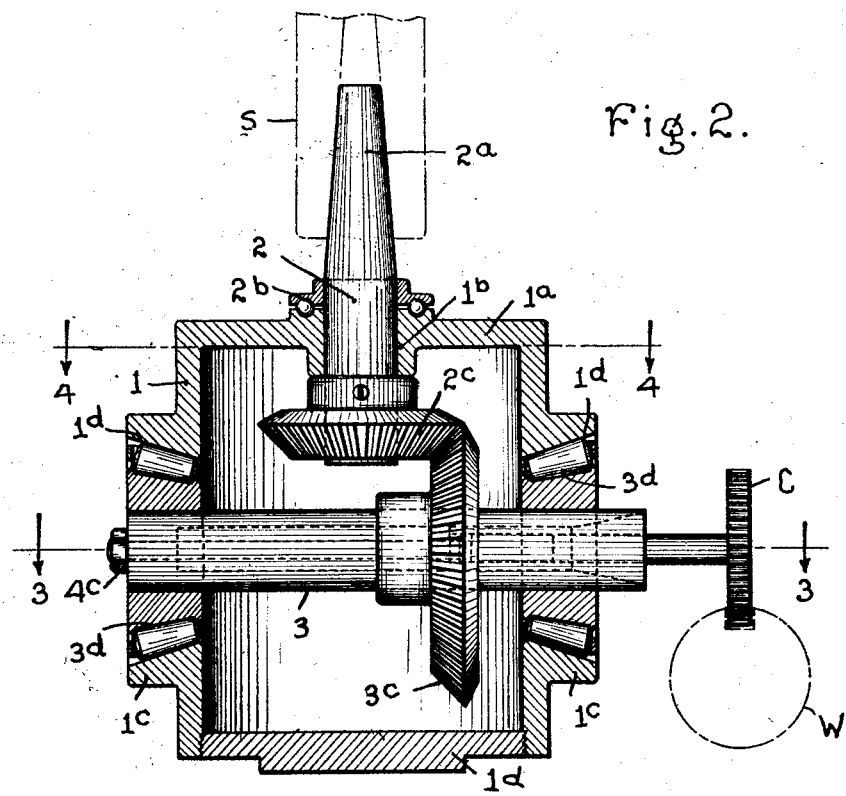
Figure 2 is a central vertical sectional view taken on the line 2—2 of Figure 1, looking in the direction of the arrows.

Suitable adjustable work holding means are provided which may be of any desired type and are illustrated conventionally at H in dotted lines, see Figure 4 of the drawings.

In the operation of the device rotation of the drive shaft 2 will be had upon rotation of the spindle S, and through the beveled pinions $2^c$ and $3^c$ motion will be imparted to the driven shaft 3 carrying the milling tool. Vertical adjustment of the entire attachment may be had through the novel bracket 5, while the work holding means H are universally adjustable for the ready positioning of the work with respect to the cutting tool.

It will be noted that said work holding means are supported by the horizontal portion of the bracket 5, and are manually operable to provide any desired adjustment or movement of the particular work as necessary.

There has thus been described an improved milling attachment, simple in operation and economically manufactured, requiring no particular skill to operate and which will readily convert any press, lathe, or analagous machine into a highly efficient and satisfactory milling machine.

The invention having thus been described what is claimed is:—

1. In a portable milling attachment for drill presses in combination, a drive shaft adapted to be fixedly secured to the machine tool spindle and having a housing mounted thereon, a rotary cutter shaft mounted within the housing having its axis of rotation angularly disposed with respect to the axis of rotation of the drive shaft, operative connections between the drive and cutter shafts comprising beveled pinions secured to the said shafts and meshing with each other, means adapted to preclude lateral movement of the milling attachment, said means comprising a base plate adapted to be fixedly secured to the machine tool table and provided with an integral perpendicularly disposed bracket arm having a dove-tailed sliding connection with the aforesaid housing.

2. In a portable milling attachment for drill presses in combination, a drive shaft adapted to be fixedly secured to the machine tool spindle and having a housing mounted thereon, a rotary cutter shaft mounted within the housing having its axis of rotation angularly disposed with respect to the axis of rotation of the drive shaft, operative connections between the drive and cutter shafts comprising beveled pinions secured to the said shafts and meshing with each other, means adapted to preclude lateral movement of the milling attachment, said means comprising a base plate adapted to be fixedly secured to the machine tool table and provided with an integral perpendicularly disposed bracket arm having a dove-tailed sliding connection with the aforesaid housing, the said housing being adapted to be retained in predetermined adjustable position on said bracket by adjustment of the machine tool spindle.

In testimony whereof he affixes his signature.

OMAR HAWKINS.